No. 636,027. Patented Oct. 31, 1899.
M. ELB.
DISINFECTING APPLIANCE.
(Application filed Mar. 7, 1898.)

(No Model.)

United States Patent Office.

MAX ELB, OF DRESDEN, GERMANY.

DISINFECTING APPLIANCE.

SPECIFICATION forming part of Letters Patent No. 636,027, dated October 31, 1899.

Application filed March 7, 1898. Serial No. 673,429. (No model.)

*To all whom it may concern:*

Be it known that I, MAX ELB, a subject of the King of Saxony, and a resident of Dresden, in the Kingdom of Saxony, German Empire, have invented certain new and useful Improvements in Disinfecting Apparatus, of which the following is a specification.

My invention relates to an improved disinfecting apparatus composed of carbon with nitrates of the alkali metals and trioxymethylene which is volatilized whereby the same is decomposed into monoöxymethylene or formic aldehyde, and this gas, as is well known, possesses strong disinfecting properties. The principal features of my improvements consist in the employment of solid polymeric products, preferably in compressed shape, and bringing these in direct contact with a mass, set aglow, which generate a gentle heat. Such a mass is obtained, for instance, by compounding carbon or carbonaceous matter with nitrates, preferably the nitrates of the alkali metals, so that the carbon is uniformly impregnated therewith. From this mixture I prepare a plastic mass, out of which I form vessels of such shape as will correspond to the form of the compressed trioxymethylene. These vessels are completely dried, and when one is set aglow then the compressed trioxymethylene, for instance, in form of a tablet, is placed therein and volatilized.

Figure 1:
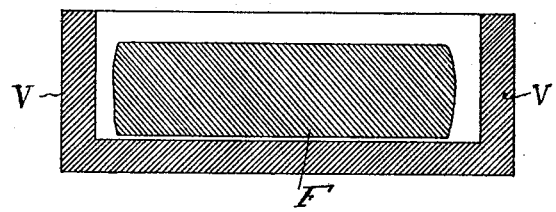
Figure 2:
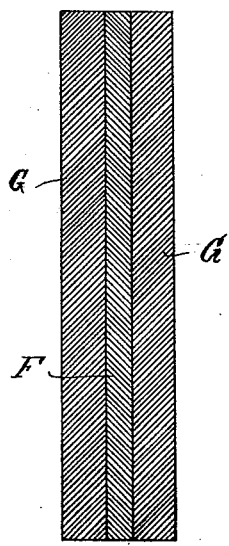

In the accompanying drawings, Figure 1 represents in section a vessel made of a mass to be set aglow and a tablet contained therein. Fig. 2 shows in section a compound tablet.

In Fig. 1, V designates the vessel, and F the tablet. The compound tablet shown in Fig. 2 consists of an inner portion or core consisting of trioxymethylene F and the outside portion G, made of the composition to be set aglow. Candles containing a wick or core of compressed trioxymethylene may likewise be manufactured. In this instance the mass surrounding the core is set aglow.

If a speedy distribution of the gaseous formic aldehyde produced by the volatilization of the trioxymethylene is desired, then I add to the mass to be set aglow some substance which is decomposed by gentle heat and at the same time generates an inoffensive and harmless gas. The gas thus produced accelerates the distribution of the gaseous formic aldehyde. The heat developed by the mass set aglow must be high enough to vaporize the trioxymethylene, but must not be so high as to ignite the vapors.

If tablets are employed, then the shape of the vessel made of the mass to be set aglow should conform in shape and size closely to the size of the tablet. Especially the walls of the vessel should be so high that they extend over the top of the tablet. In this manner the heat is retained in the vessel and some draft produced.

Having thus described my invention, I claim as new and desire to secure by Letters Patent—

1. An appliance for disinfecting, composed of a vessel made of carbon and nitrate of an alkali metal and compressed polymeric methylaldehyde contained therein and conforming in shape to the side walls of the vessel, as specified.

2. An appliance for disinfecting, composed of an inner portion or core of polymeric methylaldehyde and a surrounding body consisting of carbon and nitrate of an alkali metal, as specified.

In witness whereof I have hereunto set my hand in presence of two witnesses.

MAX ELB.

Witnesses:
 FRITZ SPERLING,
 CHAS. H. DAY.